United States Patent
Bartos

(10) Patent No.: US 6,431,205 B1
(45) Date of Patent: Aug. 13, 2002

(54) DAMPER FOR DIAPHRAGM-OPERATED PRESSURE REGULATING VALVES

(75) Inventor: Josef A. Bartos, Pomona, CA (US)

(73) Assignee: GAAP Gas Control LLC, Pomona, CA (US)

(*) Notice: Subject to any disclaimer, the term of this patent is extended or adjusted under 35 U.S.C. 154(b) by 0 days.

(21) Appl. No.: 09/803,241

(22) Filed: Mar. 8, 2001

Related U.S. Application Data
(60) Provisional application No. 60/188,826, filed on Mar. 13, 2000.

(51) Int. Cl.[7] ............................................. G05D 16/06
(52) U.S. Cl. ................................. 137/505.46; 251/64
(58) Field of Search .................... 137/505.46, 505.47; 251/64, 297

(56) References Cited

U.S. PATENT DOCUMENTS

| | | |
|---|---|---|
| 359,787 A | * 3/1887 | Hyams |
| 742,775 A | 10/1903 | Dixon |
| 746,879 A | 12/1903 | Reynolds |
| 1,255,090 A | 1/1918 | Gally |
| RE17,738 E | 7/1930 | Groble |
| 2,324,880 A | 7/1943 | Rogers et al. |
| 2,338,760 A | * 1/1944 | Deming |
| 2,701,578 A | 2/1955 | Hamilton |
| 3,056,424 A | 10/1962 | Courtot et al. |
| 3,093,153 A | 6/1963 | Horowitz |
| 3,339,581 A | 9/1967 | Courtot |
| 3,368,923 A | 2/1968 | Smith |
| 4,862,916 A | 9/1989 | Gaunt |
| 4,974,629 A | 12/1990 | Chang |
| 5,681,508 A | 10/1997 | Gerhardy |
| 5,735,306 A | * 4/1998 | Olds et al. ............. 137/505.46 |

* cited by examiner

Primary Examiner—Stephen M. Hepperle
(74) Attorney, Agent, or Firm—Vickers, Daniels & Young

(57) ABSTRACT

The pivotal lever arm of a diaphragm-actuated fluid pressure regulator is provided with a damping spring arrangement for frictionally restraining pivotal displacement of the lever arm in response to turbulent flow of gas through the valve.

3 Claims, 2 Drawing Sheets

DAMPER FOR DIAPHRAGM-OPERATED PRESSURE REGULATING VALVES

The present patent application claims the benefit of the filing date of U.S. Provisional Patent Application Ser. No. 60/188,826 filed Mar. 13, 2000 entitled Damper for Diaphragm-Operated Regulating Valves.

BACKGROUND OF THE INVENTION

This invention relates to the art of fluid pressure regulating valves, wherein a valve element including a pivotal lever arm is diaphragm actuated to control the flow of fluid through the valve and, more particularly, to the damping of lever arm oscillation during operation of the valve.

It is, of course, well known to provide fluid pressure regulators which operate in accordance with the pressure of fluid acting against a flexible diaphragm which is captured between valve housing components to provide a pressure chamber on one side of the diaphragm and a chamber vented to atmosphere on the other. The pressure chamber includes an inlet orifice for fluid under pressure from a source and an outlet passage for the flow of gas to a point of use such as, for example, a gas-operated cooking grill. A valve element controls the flow of fluid from the inlet orifice to the outlet opening and comprises a lever arm pivotally mounted in the pressure chamber and having an end connected to the diaphragm for the latter to pivot the arm about its axis during operation of the valve. The other end of the lever arm carries a resilient sealing member which, in response to pivotal displacement of the lever arm, engages and disengages the inlet orifice to respectively close and open the latter to the flow of fluid into the pressure chamber from the source. Regulating valves of the foregoing character also include a relief valve arrangement by which excessive back pressure into the pressure chamber from the point of use is vented to atmosphere.

In connection with the operation of such pressure regulating valves heretofore available, when the gas at high input pressure is forced through the restricted orifice into the pressure chamber, the flow velocity of the gas increases at it exits the orifice nozzle into the pressure chamber, whereby the gas rapidly expands and creates high frequency turbulent flow conditions in moving through the pressure chamber to the outlet. The turbulence increases during the regulating mode of operation of the valve because the gas flow is directed radially of the axis of the orifice opening in moving through the pressure chamber to the outlet opening. As a result of the turbulent condition, the lever arm vibrates or oscillates during valve operation causing fluctuating gas flow to the point of use. More importantly, the oscillation can cause diaphragm overtravel and thus, unintended opening of the safety relief valve, resulting in the venting of flammable gas to atmosphere during continued use of the valve and which, in connection with operation of a gas cooking grill, can result in fire and/or explosion.

SUMMARY OF THE INVENTION

In accordance with the present invention, a damping arrangement is provided for restraining pivotal displacement of the lever arm so as to eliminate the oscillation thereof and the undesirable flow and operating conditions of the valve resulting therefrom. In accordance with one aspect of the invention, such damping is provided by frictionally restraining pivotal displacement of the lever arm and, in accordance with a preferred embodiment, such frictional restraint is achieved through the mounting of a leaf spring on the lever arm for frictional engagement with a fixed pivot pin for the lever arm.

It is accordingly an outstanding object of the present invention to provide a damping arrangement for the pivotal lever arm of a diaphragm-actuated fluid flow pressure regulating valve.

Another object is to provide a damping arrangement for the operation of a valve element in a diaphragm-actuated pressure regulating valve for minimizing vibration or oscillation of the valve element resulting from turbulent gas flow through the valve.

Yet another object is the provision of a method for controlling the operation of a valve element in a diaphragm-actuated pressure regulating valve for minimizing vibration or oscillation of the valve element resulting from turbulent gas flow through the valve.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
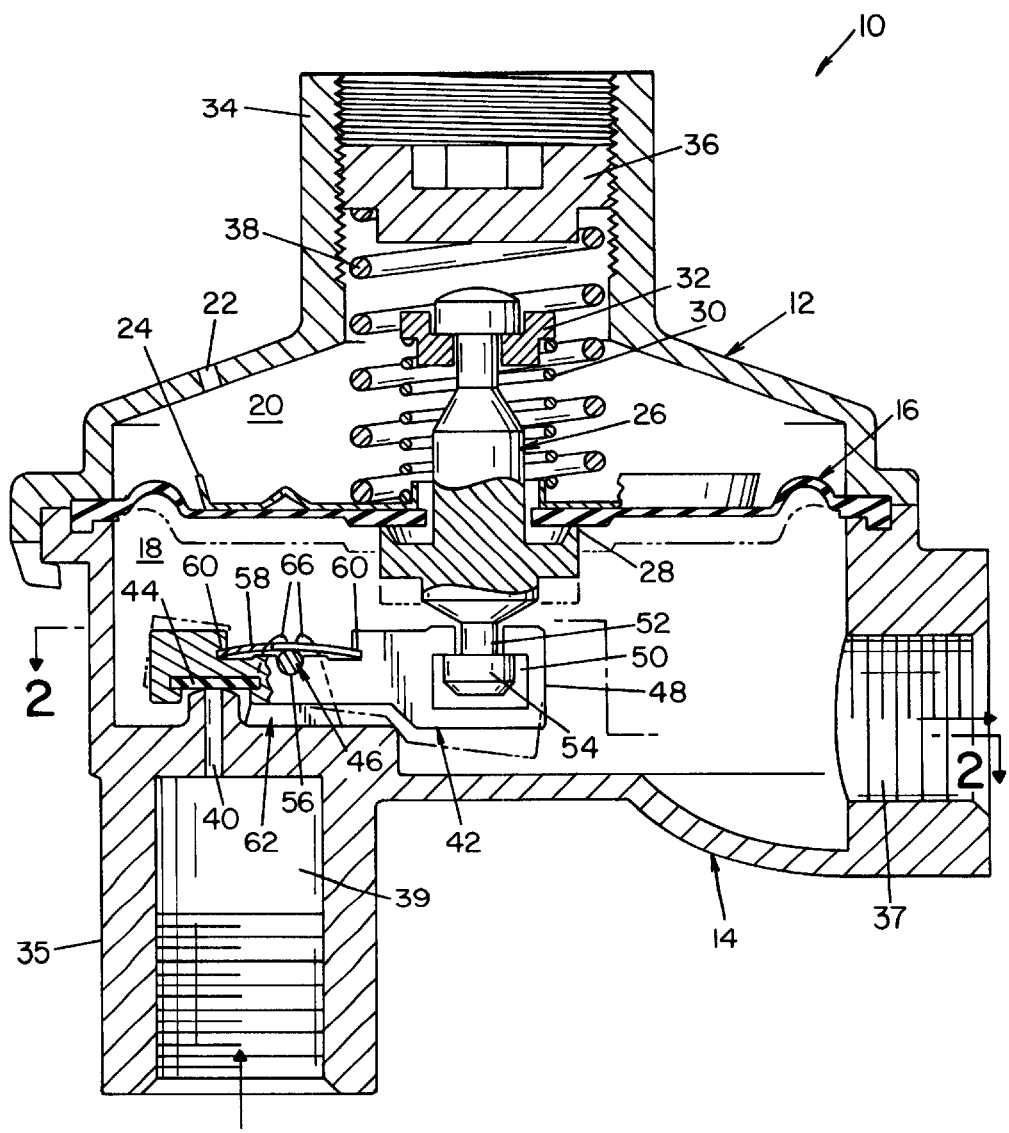
FIG. 1 is an elevation view, partially in section, of a fluid flow pressure regulating valve having a damping arrangement in accordance with the present invention; and, FIG. 2 is a plan view, in section, taken along line 2—2 in FIG. 1.
Figure 2:
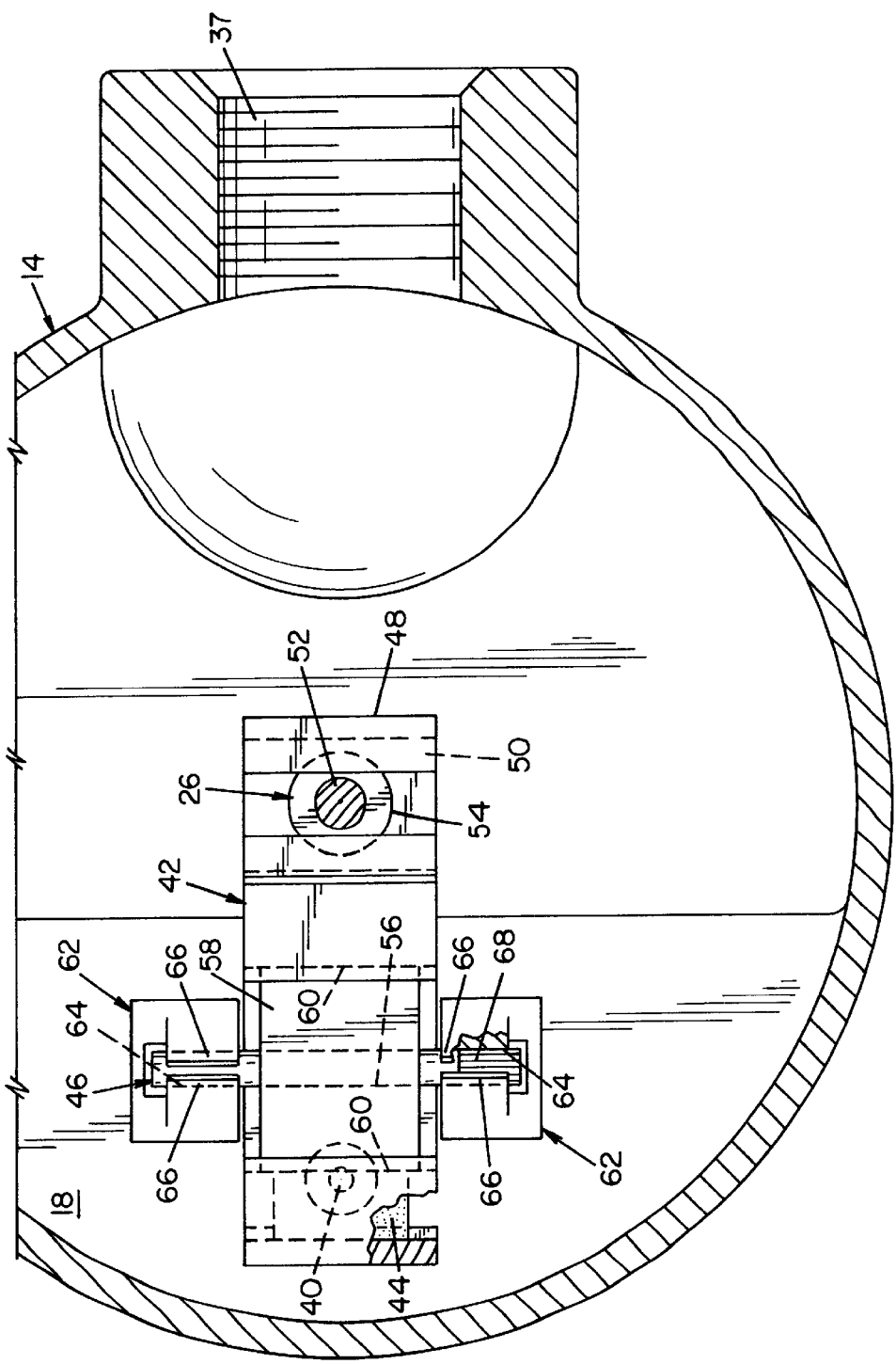

Referring now in greater detail to the drawings, wherein the showings are for the purpose of illustrating a preferred embodiment of the invention only, and not for the purpose of limiting the invention, a fluid pressure regulating valve 10 comprises upper and lower housing members 12 and 14, respectively, and a flexible diaphragm 16 which is captured between the outer peripheries of the housing members to divide the interior of the housing into a pressure chamber 18 and a venting chamber 20 which is exposed to atmosphere through a vent opening 22 in housing member 12. The diaphragm is provided with a support plate 24 which, together with the diaphragm, is centrally apertured to receive a diaphragm actuator stem and relief valve component 26 having a relief valve seat 28 in chamber 18 and engaging the underside of diaphragm 16 and which seat is biased thereagainst by a relief valve spring 30 captured between support plate 24 and a collar 32 surrounding the upper end of component 26. Upper housing 12 includes an internally threaded neck portion 34 which receives an externally-threaded regulator pressure adjusting nut 36 and, as is well known, a pressure regulating spring 38 is captured between nut 36 and support plate 24 to provide for adjusting the force of the spring against the diaphragm and thus the regulated output pressure of the valve.

Lower housing 14 is provided with an internally threaded neck portion 35 for connecting the valve to a source of gas under pressure which is supplied to chamber 18 as described in greater detail hereinafter, and chamber 18 communicates with an internally threaded outlet passageway 37 by which the valve is connected to a point of use such as, for example, a gas cooking grill. Neck 35 provides an inlet passageway 39 for gas under pressure from the source, and the gas under pressure enters chamber 18 through a restricted orifice 40 having an inner end in chamber 18 which is adapted to be opened and closed to flow therethrough by a valve element including a lever arm 42 and a resilient sealing element 44 thereon. Lever arm 42 is pivotally mounted in lower housing 14 by means of a pivot pin 46, and the lever arm has an actuating end 48 which is interconnected with diaphragm actuator stem component 26 such that the lever arm is pivoted in opposite directions about pin 46 in response to deflections of diaphragm 16 upwardly and downwardly relative to chamber 18. More particularly in this respect, end 48 of lever arm 42 is provided with an inverted T-shaped slot 50 which slidably receives an inverted T-shaped coupling member on the lower end of actuator stem component 26 and which is comprised of stem and head members 52 and 54, respectively. The opposite end of lever arm 42 supports seal element 44 for displacement toward and away from the outlet end of orifice 40 in response to pivotal displacement of the lever arm in opposite directions about pin 46.

As is well known, when the pressure of gas in chamber 18 is below the regulated pressure set by spring 38, the latter biases diaphragm 16 downwardly with respect to chamber 18, whereby lever arm 42 is pivoted clockwise about pin 46 to displace sealing element 44 away from the outlet end of orifice 40, whereupon gas under pressure flows into chamber 18 and thence radially of orifice 40 to outlet passage 37. As is likewise well known, when the pressure in chamber 18 corresponds to the regulated pressure, diaphragm 16 is biased upwardly relative to chamber 18 whereby sealing element 44 engages the outlet end of orifice 40 to close the latter against the flow of gas into chamber 18. A high inlet pressure relative to the regulated pressure together with radial or lateral as flow of gas into chamber 18 from the outlet end of orifice 40 causes a turbulence in gas flow which in turn causes the lever arm to oscillate about its pivot axis. In accordance with the present invention, such oscillation is prevented by frictionally restraining pivotal displacement of the lever arm in opposite directions relative to pivot pin 46. In the embodiment shown, this is achieved by mounting pivot pin 46 in housing member 14 against rotation relative thereto, as described more fully hereinafter, providing lever arm 42 with an upwardly open, semi-circular recess 56 which receives pin 46 such that the upper side thereof is exposed above the recess, and frictionally interengaging the pin and lever arm by means of a leaf spring component 58 having opposing ends engaged in a corresponding one of a pair of recesses 60 in the upper side of lever arm 42 and below the uppermost end of pin 46, whereby the spring plate is bowed downwardly across pin 46 to apply a frictional bias thereagainst which dampens oscillation of the lever arm during operation of the valve. While pin 46 can be mounted in housing 14 in any suitable manner against rotation relative thereto, in the embodiment shown such mounting is achieved by a pair of mounting arms 62 extending upwardly from the bottom of housing member 14 on laterally opposite sides of lever arm 42 and having upwardly open recesses 64 for receiving and supporting the ends of pivot pin 46. Arms 62 have fingers 66 which are swaged to engage the pin ends in the recesses against pivotal displacement relative thereto. Preferably, one end of pin 46 is provided with axially-extending serrations 68 to optimize retention of the pin against rotation relative to arms 62.

As many possible embodiments of the present invention may be made, and as many changes may be made in the embodiment disclosed herein, it is to be distinctly understood that the foregoing descriptive matter is to be interpreted merely as illustrative of the present invention and not as a limitation.

Having thus described the invention, it is claimed:

1. In a fluid pressure regulator of the character comprising a housing having an inlet port, an outlet port and a diaphragm actuated valve element for controlling fluid flow from said inlet port to said outlet port, said valve element including a lever arm and a resilient seal on said lever arm, a pivot pin having a pin axis and mounted in said housing against rotation about said axis, said lever arm being mounted on said pin for pivotal displacement by said diaphragm between first and second positions in which said seal respectively closes and opens said inlet port, the improvement comprising: a spring element frictionally engaging said pin for frictionally restraining said pivotal displacement of said lever arm.

2. The improvement according to claim 1, wherein said lever arm includes a pin recess receiving said pivot pin, a portion of said pin being exposed along said pin recess, and said spring element being mounted on said lever arm and engaging said exposed portion of said pin.

3. The improvement according to claim 2, wherein said spring element is a plate extending across said pin recess and having opposite edges on opposite sides of said recess, and said lever arm having plate recesses on said opposite sides of said pin recess each receiving a different one of said opposite edges to removably mount said plate on said lever arm.

* * * * *